US008775066B2

(12) United States Patent
O'Connor

(10) Patent No.: US 8,775,066 B2
(45) Date of Patent: Jul. 8, 2014

(54) THREE DIMENSIONAL TERRAIN MAPPING

(75) Inventor: Raymond M. O'Connor, Danville, CA (US)

(73) Assignee: Topcon Positioning Systems, Inc., Livermore, CA (US)

( * ) Notice: Subject to any disclaimer, the term of this patent is extended or adjusted under 35 U.S.C. 154(b) by 1128 days.

(21) Appl. No.: 11/481,360

(22) Filed: Jul. 5, 2006

(65) Prior Publication Data
US 2010/0245169 A1    Sep. 30, 2010

(51) Int. Cl.
*G01C 21/00*    (2006.01)
(52) U.S. Cl.
USPC ........................ 701/409; 701/450; 342/357.03
(58) Field of Classification Search
USPC ............. 701/213, 208, 409, 450; 342/357.03; 359/357.03
See application file for complete search history.

(56) References Cited

U.S. PATENT DOCUMENTS

| | | | |
|---|---|---|---|
| 5,574,648 A | 11/1996 | Pilley | |
| 5,761,095 A | 6/1998 | Warren | |
| 6,268,824 B1 | 7/2001 | Zhodzishky et al. | |
| 6,456,938 B1 * | 9/2002 | Barnard | 701/213 |
| 6,497,153 B1 | 12/2002 | Hoskinson et al. | |
| 6,553,312 B2 | 4/2003 | Upadhyaya et al. | |
| 6,705,942 B1 | 3/2004 | Crook et al. | |
| 2001/0035880 A1 * | 11/2001 | Musatov et al. | 345/764 |
| 2002/0169558 A1 * | 11/2002 | Smith et al. | 702/5 |
| 2004/0125365 A1 | 7/2004 | Ohtomo et al. | |
| 2004/0147329 A1 | 7/2004 | Meadows et al. | |
| 2005/0024213 A1 | 2/2005 | Franzen et al. | |
| 2005/0037872 A1 * | 2/2005 | Fredlund et al. | 473/407 |
| 2005/0143909 A1 | 6/2005 | Orwant | |
| 2007/0059098 A1 * | 3/2007 | Mayfield et al. | 404/84.5 |

FOREIGN PATENT DOCUMENTS

| | | |
|---|---|---|
| JP | 9128045 | 5/1997 |
| JP | 2004170632 | 6/2004 |
| JP | 2004191265 | 7/2004 |
| WO | 03081538 | 10/2003 |

OTHER PUBLICATIONS

Y. Liou, et al., "Precipitable Water Observed by Ground-Based GPS Receivers and Microwave Radiometry", Earth Planets Space, 52, 445-450, 2000.
European Search Report for European Patent Application No. 07010825.3-2213, dated Oct. 1, 2008.
Takashi Watanabe, et al.; "Global Restoration of Topographic Contour Image by Using Extended Voronoi Diagram"; Theory and Applications of GIS, GIS Association of Japan, Sep. 15, 1998; pp. 23-31; vol. 6, No. 2.

* cited by examiner

*Primary Examiner* — Mark Hellner
(74) *Attorney, Agent, or Firm* — Wolff & Samson, PC.

(57) ABSTRACT

Disclosed is a technique for generating a three dimensional terrain map of a geographic area. Mobile units are equipped with satellite receivers (e.g., GPS receivers) for generating location data. A map generator uses the location data to generate a three dimensional terrain map. In one embodiment, the mobile units have primary uses other than mapping, and are traversing the geographic area to be mapped in connection with their primary function. The map generation process may be performed iteratively over time, as additional location data becomes available. During a time period when location data is unavailable for a portion of the three dimensional terrain map, the map generator may estimate the missing portion of the map using the available data. The estimated portion may later be updated with actual data as that data becomes available. The map may also contain enhancements based on enhancement data received by the map generator.

15 Claims, 4 Drawing Sheets

THREE DIMENSIONAL TERRAIN MAPPING

BACKGROUND OF THE INVENTION

The present invention relates generally to terrain mapping, and more particularly to three dimensional terrain mapping.

It is often desirable to generate a terrain map for a particular geographic area. One particular case is a golf course, for which a terrain map is useful for golfers playing on the course. It is often the case that a golf course will provide a basic two dimensional terrain map to golfers. For example, it is customary for such a two dimensional terrain map to be included on a back portion of a course scorecard. While useful to a certain extent, such a two dimensional terrain map provides only limited information.

More useful to a golfer is a three dimensional terrain map, which adds terrain elevation information to the basic two dimensional map. However, the generation of a three dimensional terrain map is a more complex and expensive undertaking, and as such, they are rarely provided to golfers.

What is needed is a convenient and cost effective technique for generating a three dimensional terrain map of a geographic area.

BRIEF SUMMARY OF THE INVENTION

The present invention provides an improved technique for generating a three dimensional terrain map of a geographic area.

Mobile units are equipped with satellite receivers (e.g., GPS receivers) for generating location data. The location data may then be received by a map generator in order to generate a three dimensional terrain map using the location data. Rather than using dedicated mobile units having the sole purpose of generating location data, in an advantageous embodiment use is made of mobile units which have other primary uses, and which are traversing the geographic area to be mapped in connection with their primary function. Since these mobile units are already traversing the geographic area in accordance with their primary function, there is very little incremental expense incurred by having the mobile unit perform the secondary function of transporting a satellite receiver as well.

The map generation process may be performed iteratively over time, as additional location data becomes available. During a time period when location data is unavailable for a portion of the three dimensional terrain map, the map generator may estimate the missing portion of the map using the available data. The estimated portion may later be updated with actual data as that data becomes available.

In one exemplary advantageous embodiment, the geographic area to be mapped is a golf course, and the mobile units are lawn mowers and/or golf carts. Since these vehicles traverse the golf course in connection with their primary purpose, there is little incremental cost to equip them with a satellite receiver for generating location data for the mapping function. Over time, these vehicles will traverse all, or most, of the area to be mapped, thereby resulting in a useful three dimensional terrain map.

Various enhancements, such as wind direction/velocity and atmospheric water vapor data may also be added to the three dimensional terrain map if additional enhancement data is provided to the map generator. In addition, multiple versions of the terrain maps (with or without enhancements) may be stored in an historical map database. These stored maps may be analyzed to identify changes over time and trends.

These and other advantages of the invention will be apparent to those of ordinary skill in the art by reference to the following detailed description and the accompanying drawings.

DETAILED DESCRIPTION

Figure 1:
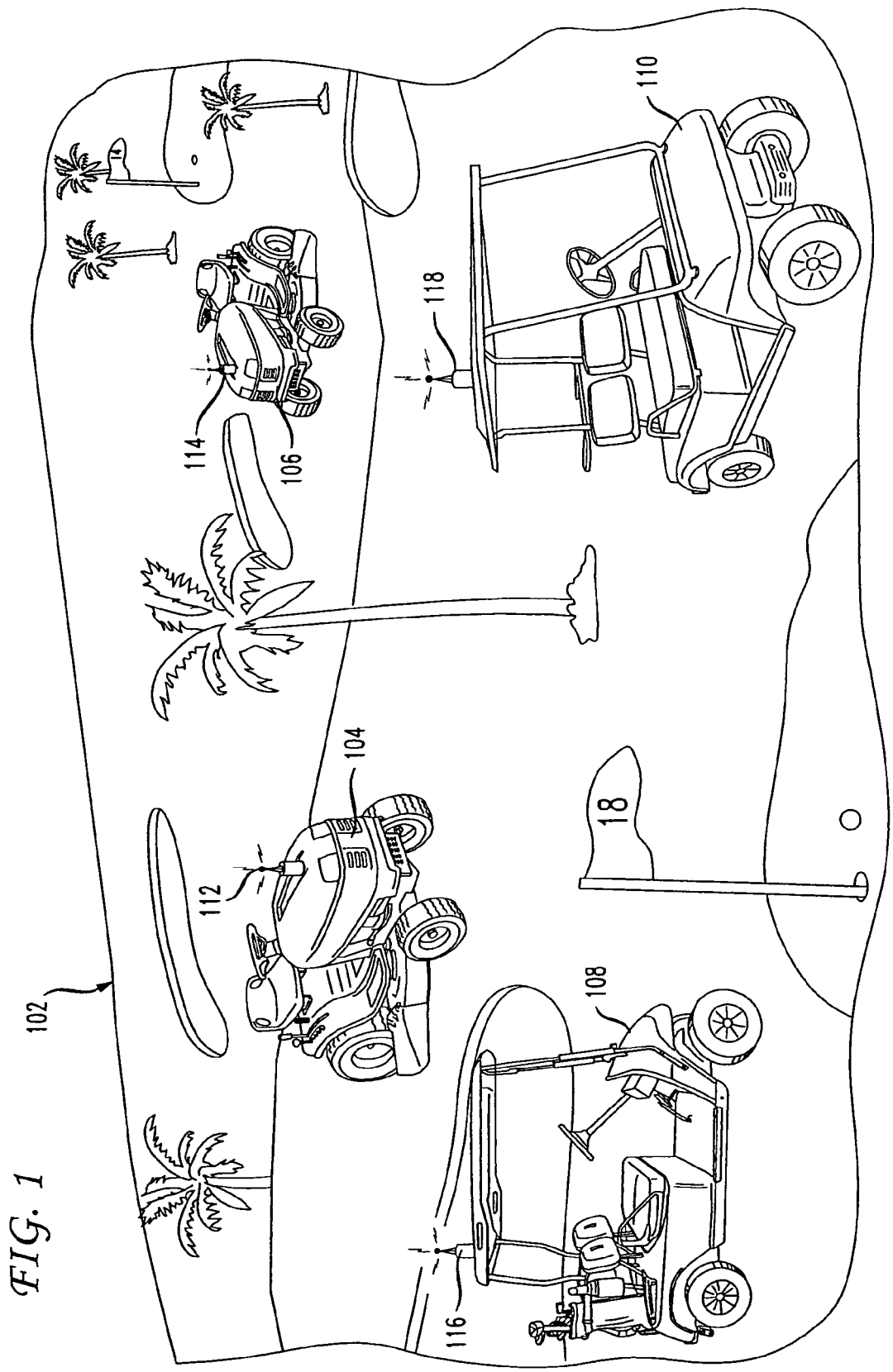
FIG. 1 shows a geographic area including mobile units.

FIG. 1 shows a geographic area 102 (for example a golf course) to illustrate a technique for three dimensional geographic terrain mapping in accordance with an embodiment of the present invention. In this description, a particular embodiment in which the geographic area to be mapped is a golf course will be described. However, it should be recognized that the principles of the present invention may be applied to any geographic area.

In accordance with the principles of the present invention, three dimensional terrain mapping is performed by equipping mobile units with Global Navigation Satellite Systems (GNSS) receivers. GNSS are well known and used to solve a wide variety of positioning/time related tasks. Two well known such systems are the Global Positioning System (GPS) of the United States and the GLObal NAvigation Satellite System (GLONASS) of Russia. For ease of reference, this description will generally refer to the GPS system, but it is to be understood that the present description is equally applicable to GLONASS, combined GPS+GLONASS, or any other GNSS systems.

As described above, mobile units are equipped with GPS receivers for generating location data. However, rather than using dedicated mobile units having the sole purpose of generating location data, advantageous use is made of mobile units which have other primary uses, and which are traversing the geographic area of the golf course in connection with their primary function. For example, consider a golf course lawn mower, which is a mobile unit having a primary purpose of mowing the grass on the course. The lawn mower traverses the terrain in the course of performing its primary function. Another example is a golf cart having a primary purpose of transporting golfers around the course. The golf cart also traverses the terrain in the course of performing its primary transportation function. The present inventors have realized that these types of vehicles, that traverse the geographic area in connection with their primary function, may also be used to provide location data to a three dimensional terrain mapping function. Since these vehicles are already traversing the geographic area in accordance with their primary function, there is very little incremental expense incurred by having the vehicle perform the secondary function of transporting a GPS receiver as well. Other examples of such vehicles includes thatching machines, construction vehicles, grass maintenance vehicles, etc.

Returning now to FIG. 1, consider geographic area 102 and mobile units 104, 106, 108 and 110. As shown in FIG. 1, mobile units 104 and 106 are lawn mowers, and vehicles 108 and 110 are golf carts. Lawn mower 104 is equipped with GPS receiver 112, lawn mower 106 is equipped with GPS receiver 114, golf cart 108 is equipped with GPS receiver 116, and golf cart 110 is equipped with GPS receiver 118. The placement of the GPS receivers in these vehicles is such so as not to interfere with the vehicle's primary purpose.

Figure 2:
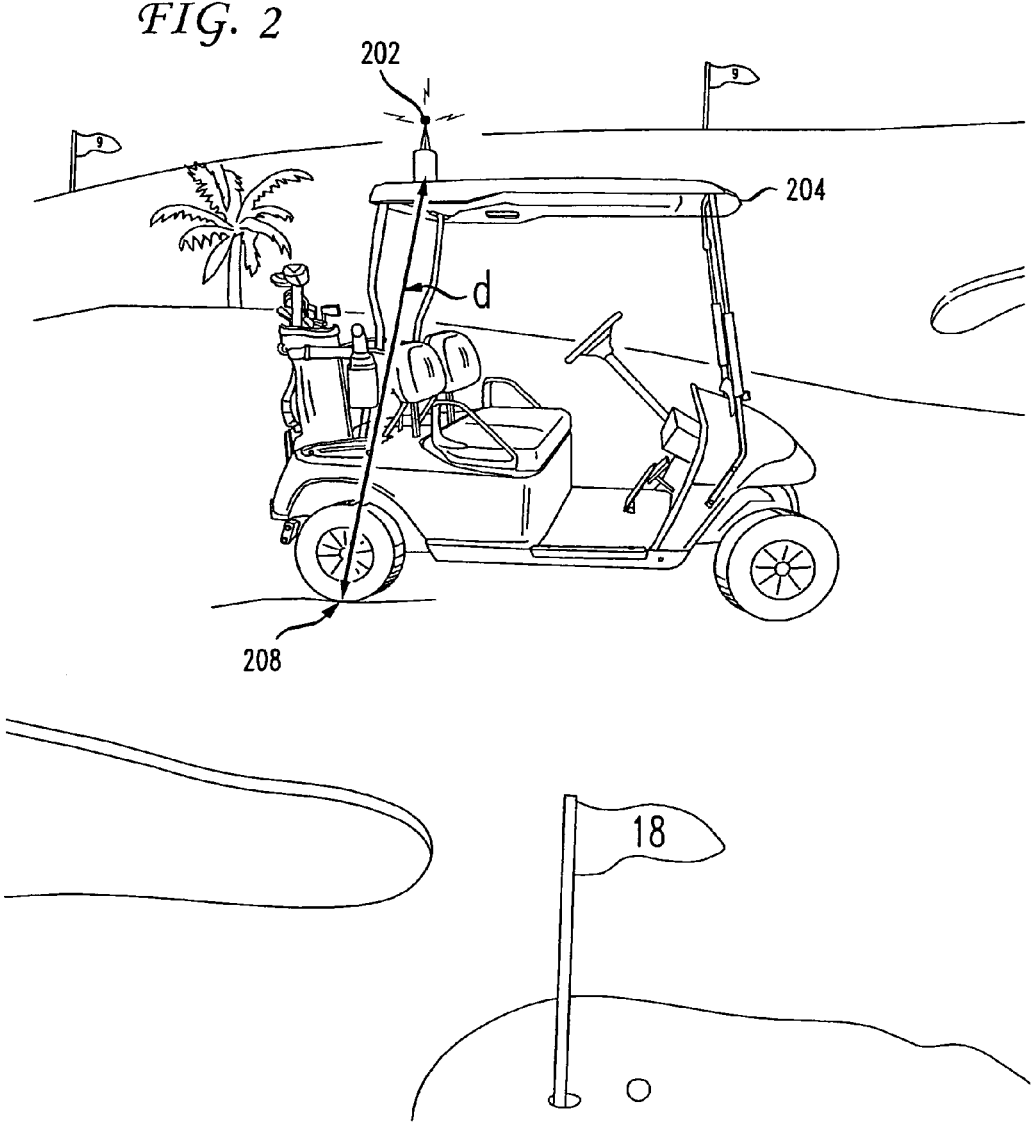
FIG. 2 illustrates the mounting of a GPS receiver on a mobile unit.

The mounting of a GPS receiver on a mobile unit is shown illustrated in FIG. 2. As is well known, in order to generate accurate location data, a GPS receiver needs line of sight signal reception to a number of earth orbiting satellites. As such, it is advantageous to mount the GPS receiver at a location that will provide such line of sight signal reception. As shown in FIG. 2, GPS receiver 202 is mounted on the roof of golf cart 204. This mounting location of GPS receiver 202 is known relative to the ground 208. If the distance between the GPS receiver 202 and the ground 208 is known to be distance d, then the ground elevation can be determined by subtracting d from the elevation calculation of the GPS receiver 202 in a straightforward manner. One skilled in the art will recognize that this simple example may need to be modified to take into account any variation in the fixed distance d, e.g., due to compression/expansion of the golf cart 204 suspension mechanism, if any, or any other variations in the mounting location of the GPS receiver 202.

Figure 3:
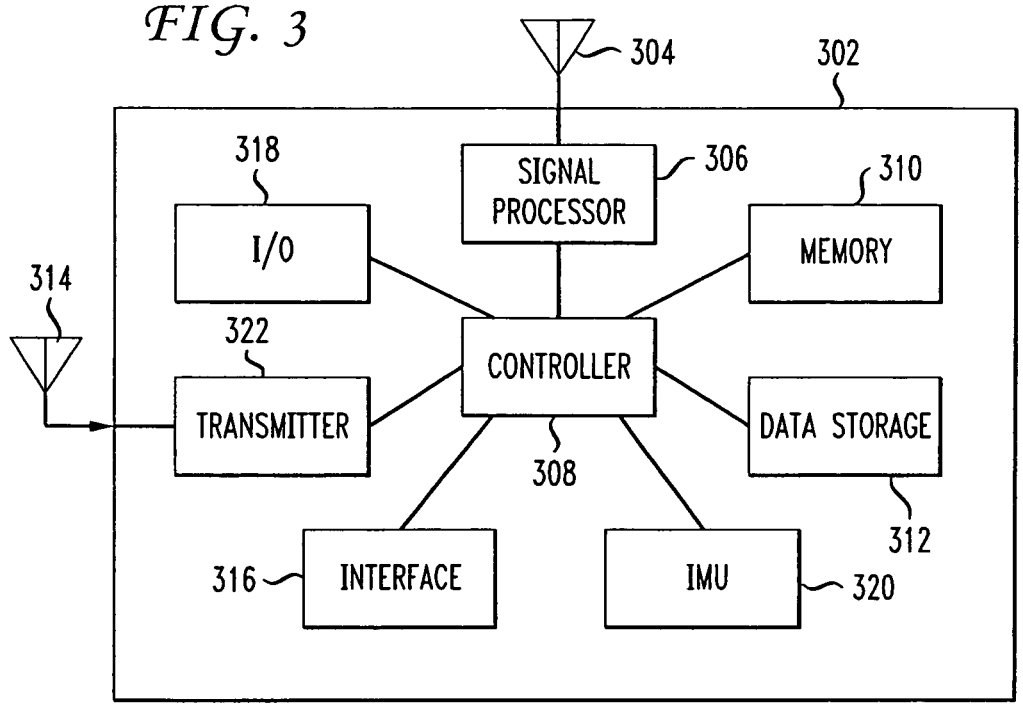
FIG. 3 shows a high level block diagram of a GPS receiver which may be used in an implementation of the present invention.

A high level block diagram of a GPS receiver which may be used in an implementation of the present invention is shown in FIG. 3. GPS receiver 302 includes a controller 308 for controlling the overall operation of the GPS receiver 302. In one embodiment, the controller may be a computer processor which executes stored computer program code which may be stored, for example, in a memory 310. The computer program code defines the overall operation of the GPS receiver 302. The GPS receiver includes an antenna 304 for receiving signals from GPS satellites. The received signals are processed by signal processor 306 in a well known manner in order to generate location data (e.g., x,y,z coordinates in a Cartesian coordinate system). Generally, the location data may be determined by measuring time delay of received satellite signals relative to a local reference clock. These measurements enable the receiver to determine the so-called pseudo-ranges between the receiver and the satellites. If the number of satellites is large enough, then the measured pseudo-ranges can be processed to determine the location of the GPS receiver. The accuracy of the location determination may be increased through the use of various techniques. One such technique is differential navigation (DN) in which the location data is determined relative to a base station at a known location. The location determination accuracy of differential navigation may be improved further by supplementing the pseudo-range measurements with measurements of the phases of the satellite carrier signals. If the carrier phase of the signal received from a satellite in the base receiver is measured and compared to the carrier phase of the same satellite measured in the rover receiver, measurement accuracy may be obtained to within several percent of the carrier's wavelength. The above described computations are well known in the art and are described in further detail, for example, in, Bradford W. Parkinson and James J. Spilker Jr., *Global Positioning Theory and Applications*, Volume 163 of Progress In Astronautics and Aeronautics, published by the American Institute of Aeronautics and Astronautics, Inc, Washington D.C., 1996. A real-time-kinematic (RTK) GPS system, which utilizes satellite carrier phase in combination with differential navigation techniques is also described in U.S. Pat. No. 6,268,824. An RTK system could be used in an implementation of the present invention in order to improve the accuracy of the location data.

It would be recognized that elevation information is an important component of the location data provided by the GPS unit. However, one known deficiency in some GPS location techniques is a lack of accuracy in vertical position measurements. As such, determining the height of a GPS receiver cannot be determined with the same accuracy as that for the horizontal measurements. One technique for increasing the accuracy of height calculations is to supplement the GPS calculations with another system. For example, U.S. Patent Application Publication No. US2004/0125365 A1, entitled Working Position Measuring System, discloses a system that accurately determines the vertical angle (i.e., elevation angle) from an appropriately equipped rotating laser transmitter to a laser receiver. The rotating laser system generally includes a rotating laser at a fixed location, with a photodetector at the target location. The photodetector periodically detects the rotating laser beam and generates a signal based upon receipt of the laser (i.e., when the laser beam strikes a photocell of the detector). In an advantageous embodiment, the transmitted laser beam comprises fan shaped beams in the shape of the letter N. The signal may be processed using various techniques in order to provide additional positioning/geometric information, such as the vertical angle between the photodetector and the laser transmitter. Using well known geometry, given the vertical angle between the photodetector (at the target location) and the laser transmitter, the relative height of the photodetector and the laser transmitter can be determined if the horizontal separation distance between the laser transmitter and the photodetector is known. Since the absolute height of the laser transmitter is known, the absolute height of the target can be determined once the relative height of the photodetector and the laser transmitter is calculated. These techniques may be used in an implementation of the present invention in order to improve the vertical position measurement.

Returning now to FIG. 3, in one particular embodiment, the location data generated by the GPS receiver 302 is stored in a data storage device 312 (e.g., optical or magnetic disk drive, electronic memory, etc.) for later retrieval and use as described below. The later retrieval could be via interface 316 which could provide for network or direct connectivity to another computer or other processing machine. Alternatively, the location data generated by the GPS receiver 302 may be transmitted wirelessly (e.g., in real time) to another location for processing via a transmitter 322 and antenna 314. Further, the location data could be both stored in data storage 312 and transmitted via transmitter 322 and antenna 314. The GPS receiver 302 also includes input/output 318 for allowing user interaction with the GPS receiver 302. Input/output 318 may be any type of user interface device, for example, display, keyboard, mouse, speakers, buttons, etc.

In one embodiment, the GPS receiver 302 may also include an inertial measurement unit (IMU) 320 for supplementing the location data generated by the signal processor 306. For example, the IMU 320 may comprise various components, such as accelerometers, gyroscopes, tilt sensors, etc., which may be used to increase the accuracy of the location data generated by the GPS receiver 302. In addition, the IMU may be used to generate location data when satellite signals are not available. One skilled in the art will recognize that an implementation of an actual GPS receiver will contain other components as well, and that FIG. 3 is a high level representation of some of the components of such a GPS receiver for illustrative purposes.

Figure 4:
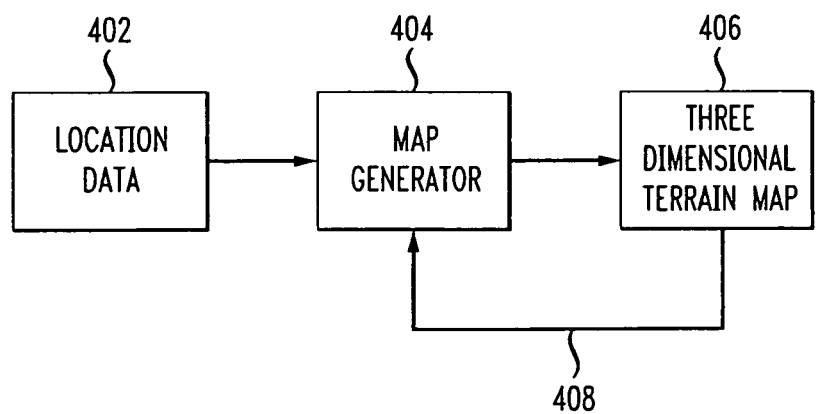
FIG. 4 illustrates map generation using location data.

FIG. 4 illustrates map generation using the location data generated by the GPS receivers. As shown in FIG. 4, the location data 402 generated by the GPS receivers is provided to a map generator 404. As described above, the location data may be provided to the map generator via interface 316, via transmitter 312 and antenna 314, or via both means. Location data 402 represents the location data generated by any number of GPS receivers that are equipped on the mobile units as described above. Upon receipt of the location data, the map generator 404 uses the location data to generate a three dimensional terrain map 406. The map generator 404 may be implemented using an appropriately programmed general purpose computer. Techniques for generating a three dimensional terrain map 406 using location data 402 (e.g. x,y,z coordinates) are well known in the art.

Figure 5:
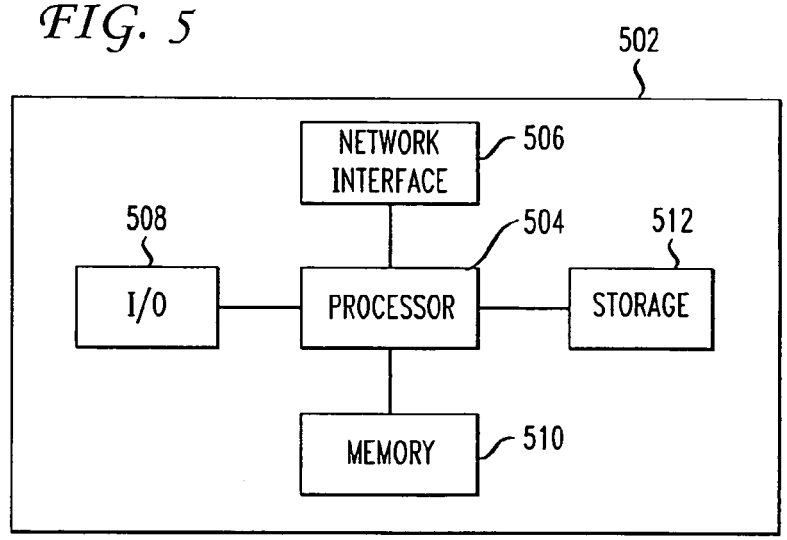
FIG. 5 shows a high level block diagram of a computer which may be used to implement a map generator.

As described above, the map generator 404 may be implemented using an appropriately programmed computer. Such computers are well known in the art, and may be implemented, for example, using well known computer processors, memory units, storage devices, computer software, and other components. A high level block diagram of such a computer is shown in FIG. 5. Computer 502 contains a processor 504 which controls the overall operation of computer 502 by executing computer program instructions which define such operation. The computer program instructions may be stored in a storage device 512 (e.g., magnetic disk) and loaded into memory 510 when execution of the computer program instructions is desired. Thus, the map generator will function as defined by computer program instructions stored in memory 510 and/or storage 512 and the map generator will be controlled by processor 504 executing the computer program instructions. Computer 502 also includes one or more network interfaces 506 for communicating with other devices via a network (e.g., wired or wireless). For example, the network interface 506 may be used to receive the location data 402. Computer 502 also includes input/output 508 which represents devices which allow for user interaction with the computer 502 (e.g., display, keyboard, mouse, speakers, buttons, etc.). One skilled in the art will recognize that an implementation of an actual computer will contain other components as well, and that FIG. 5 is a high level representation of some of the components of such a computer for illustrative purposes.

The map generation process may be performed iteratively over time, as additional location data becomes available. As described above, the location data is generated by GPS receivers mounted on mobile units having a primary purpose other than the generation of location data. Thus, as the mobile units traverse the geographic region in performance of their primary function, they will also be generating location data for use in map generation. In the example of a golf course, it is unlikely that a single golf cart or lawn mower will traverse enough of the geographic area in one day to generate enough location data to generate a useful terrain map. However, each additional GPS receiver on additional golf carts and lawn mowers will generate additional location data for use in the map generation process. Thus, over the course of time, the GPS receivers will generate enough location data in order to generate a useful three dimensional terrain map. The amount of time necessary to generate the required data will of course vary depending upon the particular implementation. Thus, over the course of time, additional location data will be provided to the map generator 404, and the three dimensional terrain map 406 will be improved upon using the additional location data. This iterative process is illustrated in FIG. 4 via loopback 408. During a time period when location data is unavailable for a portion of the three dimensional terrain map, the map generator 404 may estimate the missing portion of the map using the available data. The estimated portion may later be updated with actual data as that data becomes available.

With respect to the three dimensional terrain map 406, it is to be understood that the map may take on various forms. In one embodiment, the map may be generated on a two dimensional surface (e.g., paper), with the three dimensional contour aspects being indicated in some form on the map. Alternatively, the map may be generated to be displayed on a an electronic display device (e.g., a handheld device). While the electronic display screen is also a two dimensional surface, such display screens are capable of generating three dimensional graphical displays. Thus, one skilled in the art will recognize that the three dimensional terrain map 406 may take on various forms, and that the three dimensional nature of the map describes the information it conveys, and not necessarily the form of the map itself. For example, the three dimensional terrain map 406 may be a printed map, or may be electronic data which, when used to generate information on a visual display device, results in one of various representations of a three dimensional terrain map.

Figure 6:
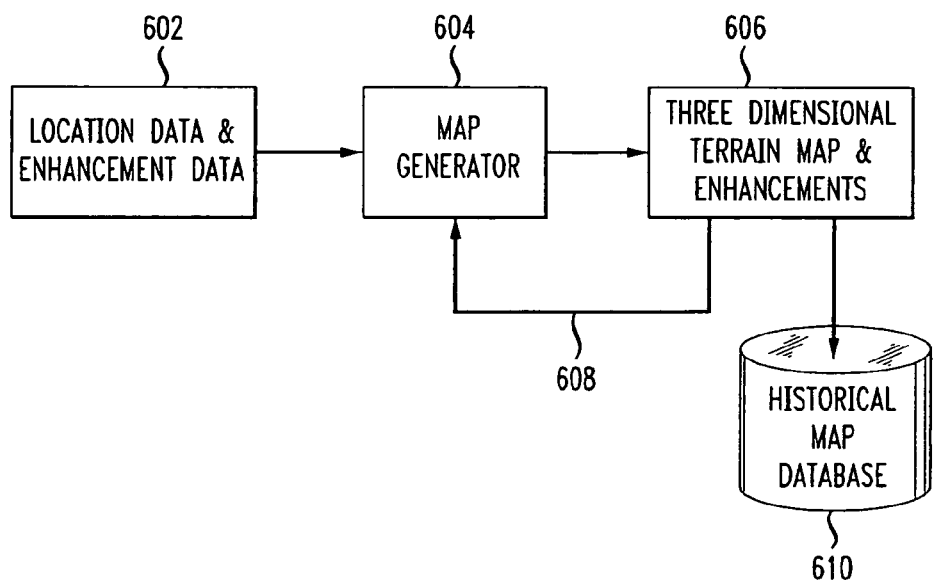
FIG. 6 illustrates map generation using location data and enhancement data.

In addition to using location data to generate a map, additional (also referred to herein as enhancement) data may also be used to add additional information to the map. An embodiment that takes advantage of such enhancement data is shown in FIG. 6. FIG. 6 is similar to FIG. 4, and illustrates the use of location data and enhancement data 602 by a map generator 604 in order to generate a three dimensional terrain map plus enhancements 606. The location data and enhancement data 602 is provided to map generator 604 in a manner similar to that described above in connection with FIG. 4. The map generator 604 uses the location data and enhancement data 602 to generate a three dimensional terrain map with enhancements 606. Loopback 608 illustrates an iterative process as discussed above in connection with loopback 408 of FIG. 4. In addition to the three dimensional terrain data described above, the map 606 also contains data representing certain enhancements. As described above in connection with FIG. 4, the map generator 604 may be implemented using an appropriately programmed general purpose computer.

One type of enhancement data that may be used in conjunction with the embodiment of FIG. 6 is atmospheric water vapor data. As is well known in the art, data from GPS receivers may be used to determine atmospheric water vapor. Techniques for sensing atmospheric water vapor using GPS measurements are identified in Yuei-An Liou, Cheng-Yung Huang, and Yu-Tun Teng, Precipitable Water Observed by Ground-Based GPS Receivers and Microwave Radiometry, Earth Planets Space, 52, 445-450, 2000. Thus, in addition to receiving location data, the map generator 604 may also receive atmospheric water vapor data that was generated using GPS measurements. This atmospheric water vapor data may be incorporated as an enhancement into the three dimensional terrain map 606 to provide additional information to a user. In the embodiment in which the geographic area is a golf course, the additional atmospheric data may provide useful information to a golfer using the map.

Another type of enhancement data that may be used in conjunction with the embodiment of FIG. 6 is wind data. In this embodiment, data regarding wind direction and velocity may be detected by various well known types of wind sensors which may be located at various points in the geographic area being mapped. Thus, in addition to receiving location data, the map generator 604 may also receive wind data that was generated by the wind sensors. This wind data may be incorporated as an enhancement into the three dimensional terrain map 606 to provide additional information to a user. In the embodiment in which the geographic area is a golf course, the additional wind data may provide useful information to a golfer using the map.

In accordance with another embodiment, the map 606 may be provided to an historical map database 610 for storage. This provides for storage of various map versions over time, which allows for analysis of changes in the maps over time. For example, the maps could be analyzed with respect to wind velocity and direction over time, and this analysis could later be used to predict wind velocity and direction at some later point in time. It is noted that while the historical map database 610 is shown in FIG. 6 in conjunction with the three dimensional terrain map with enhancements 606, an historical map database may also be used in conjunction with the FIG. 4 embodiment for storing the three dimensional terrain map 406.

With respect to the mobile units on which the GPS receivers are located, it is to be understood that such mobile units are not limited to those described herein. Any unit, on which a GPS receiver may be located, and which traverses a geographic area, may be considered a mobile unit as used herein. For example, humans may be considered mobile units if they traverse a geographic area. In the golf course example, a golfer may carry a GPS device on his/her person, and the GPS device may generate location data. In this case, the golfer's primary purpose for being on the golf course is to play golf, and not to map the golf course terrain. However, in accordance with an advantage of the invention, since the golfer is traversing the terrain anyway, the GPS receiver may utilize the mobility of the golfer in order to generate the golf course location data. Another example of a mobile unit that may be used in conjunction with the principles of the present invention includes automobiles traveling on roads and highways. In all of these examples the mobile unit's primary function is other than mapping the terrain it is traversing, but the terrain mapping function may advantageously "piggy-back" off of the movement in connection with the primary purpose.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for generating a three dimensional terrain map comprising:
  receiving location data from a plurality of satellite receivers located on a plurality of mobile units;
  receiving enhancement data;
  generating a three dimensional terrain map including enhancements, wherein said enhancements comprise wind direction and velocity, using said received location data and said enhancement data;
  storing a plurality of versions over time of said three dimensional terrain map; and
  analyzing changes in said versions of said three dimensional terrain map over time.

2. A method for generating a three dimensional terrain map comprising:
  receiving location data from a plurality of satellite receivers located on a plurality of mobile units;
  receiving enhancement data;
  generating a three dimensional terrain map including enhancements, wherein said enhancements comprise atmospheric water vapor, using said received location data and said enhancement data;
  storing a plurality of versions over time of said three dimensional terrain map; and
  analyzing changes in said versions of said three dimensional terrain map over time.

3. An apparatus for generating a three dimensional terrain map comprising:
  means for receiving location data from a plurality of satellite receivers located on a plurality of mobile units;
  means for receiving enhancement data;
  means for generating a three dimensional terrain map including enhancements, wherein said enhancements comprise wind direction and velocity, using said received location data and said enhancement data;
  a database for storing a plurality of versions over time of said three dimensional terrain map; and
  means for analyzing changes in said versions of said three dimensional terrain map over time, wherein said means for analyzing further comprises means for predicting wind velocity and direction at a future time.

4. The method of claim 1 wherein said mobile units serve a primary purpose other than mapping said terrain.

5. The method of claim 1 wherein said mobile units are golf carts.

6. The method of claim 1 wherein said mobile units are lawn mowers.

7. The method of claim 1 further comprising the step of:
  estimating a portion of said three dimensional terrain map if location data is unavailable for said portion.

8. The method of claim 7 further comprising the step of:
  updating an estimated portion of said three dimensional terrain map when location data becomes available for said portion.

9. The apparatus of claim 3 wherein said mobile units serve a primary purpose other than mapping said terrain.

10. The apparatus of claim 3 wherein said mobile units are golf carts.

11. The apparatus of claim 3 wherein said mobile units are lawn mowers.

12. The apparatus of claim 3 further comprising:
  means for estimating a portion of said three dimensional terrain map if location data is unavailable for said portion.

13. The apparatus of claim 12 further comprising:
  means for updating an estimated portion of said three dimensional terrain map when location data becomes available for said portion.

14. The apparatus of claim 3 wherein said enhancements further comprise atmospheric water vapor.

15. The method of claim 1 wherein said step of analyzing further comprises predicting wind velocity and direction at a future time.

* * * * *